(12) United States Patent
Goh

(10) Patent No.: US 8,564,698 B2
(45) Date of Patent: Oct. 22, 2013

(54) CORRECTING IMAGE GENERATED BY AN IMAGE GENERATING APPARATUS

(75) Inventor: Bang-Young Goh, Seoul (KR)

(73) Assignee: LG Electronics Inc., Seoul (KR)

( * ) Notice: Subject to any disclaimer, the term of this patent is extended or adjusted under 35 U.S.C. 154(b) by 882 days.

(21) Appl. No.: 11/320,109

(22) Filed: Dec. 27, 2005

(65) Prior Publication Data

US 2006/0146197 A1    Jul. 6, 2006

(30) Foreign Application Priority Data

Jan. 3, 2005    (KR) .................. 10-2005-0000257

(51) Int. Cl.
*H04N 9/64* (2006.01)
*H04N 5/235* (2006.01)
*H04N 9/73* (2006.01)

(52) U.S. Cl.
USPC ...... 348/248; 348/243; 348/230.1; 348/225.1

(58) Field of Classification Search
USPC ............... 348/248, 243, 230.1–230.3, 222.1, 348/225.1, 274, 360; 358/518, 520
See application file for complete search history.

(56) References Cited

U.S. PATENT DOCUMENTS

| | | | |
|---|---|---|---|
| 6,809,763 B1* | 10/2004 | Yoshida | 348/248 |
| 7,218,351 B2* | 5/2007 | Miyahara et al. | 348/313 |
| 7,349,108 B2* | 3/2008 | Ito | 358/1.12 |
| 2003/0107662 A1* | 6/2003 | Suzuki | 348/249 |
| 2004/0169750 A1 | 9/2004 | Miyahara et al. | |
| 2005/0093992 A1* | 5/2005 | Fukumoto | 348/222.1 |
| 2005/0094896 A1* | 5/2005 | Masumura et al. | 382/276 |
| 2006/0152606 A1* | 7/2006 | Noguchi | 348/248 |
| 2006/0164518 A1* | 7/2006 | Nakami | 348/222.1 |

FOREIGN PATENT DOCUMENTS

JP    2001-024943    1/2001

* cited by examiner

*Primary Examiner* — Joel Fosselman
(74) *Attorney, Agent, or Firm* — Lee, Hong, Degerman, Kang & Waimey

(57) ABSTRACT

An image correcting apparatus and method are disclosed to correct a smear vertical line on an image captured by a camera. The method for correcting an image comprising: detecting image data corresponding to a vertical line of a specific image and having hue values greater than a hue reference value; and correcting the detected image data.

7 Claims, 2 Drawing Sheets

CORRECTING IMAGE GENERATED BY AN IMAGE GENERATING APPARATUS

Pursuant to 35 U.S.C. §119(a), this application claims the benefit of earlier filing date and right of priority to Korean Patent Application Nos. 10-2005-0000257 Jan. 3, 2005, which is hereby incorporated by reference herein in their entirety.

BACKGROUND OF THE INVENTION

1. Field of the Invention

The present invention relates to an apparatus and method for correcting an image.

2. Description of the Background Art

In general, a CCD (Charged Coupled Device) camera converts an image exposed to an image sensor into an electrical signal. For example, the CCD camera recognizes hue (red, green and blue) of light received through its lens, converts it into an electrical signal (analog signal), and then, converts the electrical signal into digital data.

FIGS. 1 and 2 are exemplary views showing a smear phenomenon occurring when an image of light is captured through a general CCD camera.

As shown in FIGS. 1 and 2, when an image of light such as an electric light or the sun is captured through the general CCD camera, a vertical line (or vertical lines) appears on the captured image. The vertical line appearing on the image is called a smear phenomenon or a smear vertical line. Herein, the smear vertical line has white hue or a hue similar to the white hue, which may appear when an overload is taken to a pixel or a scan region corresponding to a light source of the captured image.

That is, the related art has a problem that when the light source such as the sun is taken through the CCD camera, the smear vertical line appears centered about the light source (e.g., the sun) of the captured image.

BRIEF DESCRIPTION OF THE INVENTION

Therefore, an object of the present invention is to provide an apparatus and method for correcting an image capable of a smear vertical line on an image captured by a camera.

To achieve these and other advantages and in accordance with the purpose of the present invention, as embodied and broadly described herein, there is provided a method for correcting an image comprising: detecting image data corresponding to a vertical line of a specific image and having hue values greater than a hue reference value; and correcting the detected image data.

To achieve the above object, there is also provided a method for correcting an image comprising: scanning a vertical line of image data; detecting image data having hue values greater than a hue reference value among hue values of image data corresponding to the scanned vertical line; determining a vertical line corresponding to the detected image data as a smear vertical line; and correcting the determined smear vertical line with image data adjacent to the determined smear vertical line.

To achieve the above object, there is also provided a method for correcting an image comprising: scanning a vertical line of image data; detecting first image data having hue values greater than a hue reference value among hue values of image data corresponding to the scanned vertical line; determining a vertical line corresponding to the first image data as a smear vertical line; detecting second image data partially having hue values greater than the hue reference value on the scanned vertical line; and recognizing the second image data as a light source, and correcting the first image data with image data adjacent to the first image data when the smear vertical line is positioned based on the center of the recognized light source.

To achieve the above object, there is also provided an apparatus for correcting an image comprising: a detecting unit for detecting image data corresponding to a vertical line of an image and having hue values greater than a hue reference value; and a correction unit for correcting the detected image data.

To achieve the above object, there is also provided an apparatus for correcting an image comprising: a smear vertical line determining unit for scanning a vertical line of image data, detecting image data having hue values greater than a hue reference value among hue values of image data corresponding to the scanned vertical line, and determining the vertical line corresponding to the detected image data as a smear vertical line; and a smear vertical line correcting unit for replacing the determined smear vertical line with image data adjacent to the determined smear vertical line.

To achieve the above object, there is also provided an apparatus for correcting an image comprising: a buffer for storing image data corresponding to an image captured by a CCD (Charged Coupled Device) camera; a smear vertical line determining unit for vertically scanning a vertical line of the image data outputted from the buffer, detecting image data having hue values greater than a hue reference value among hue values of image data corresponding to the scanned vertical line, and determining a vertical line corresponding to the detected image data as a smear vertical line; and a smear vertical line correction unit for correcting the determined smear vertical line with image data adjacent to the determined smear vertical line.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

An apparatus and method for correcting an image capable of correcting a smear vertical line on an image captured by a camera by correcting image data corresponding to a vertical line of an image captured by a camera (e.g., a CCD camera) and having hue values greater than a hue reference value, in accordance with the present invention will now be described with reference to FIGS. 3 and 4.

Figure 1:
FIGS. 1 and 2 are exemplary view showing a smear phenomenon occurring when strong light is captured through a general CCD camera.
Figure 2:
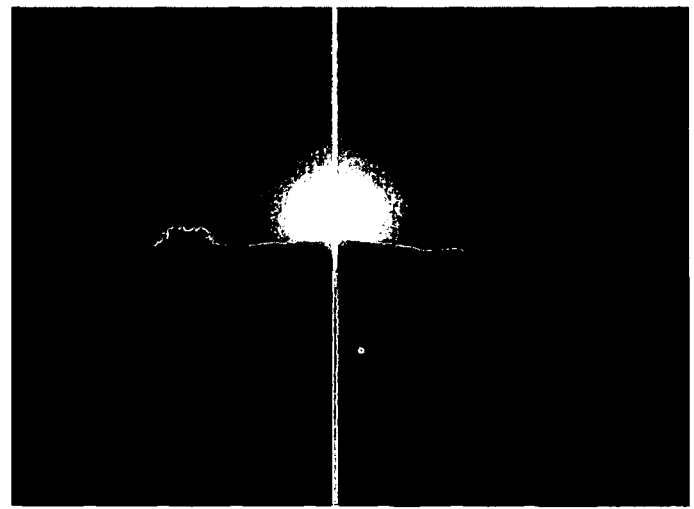
Figure 3:
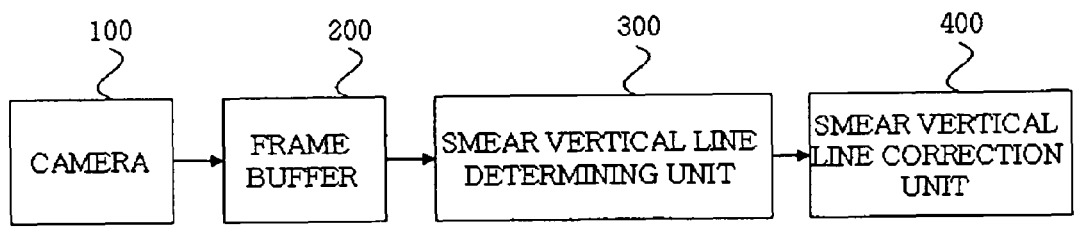
FIG. 3 is a schematic block diagram showing the construction of an image correcting apparatus in accordance with the present invention.

FIG. 3 is a schematic block diagram showing the construction of an image correcting apparatus in accordance with the present invention.

As shown in FIG. 3, an image correcting apparatus in accordance with the present invention includes: a frame buffer 200 for storing image data corresponding to an image captured by a camera (e.g., a CCD camera) 100; a smear vertical line determining unit 300 for vertically scanning a vertical line of image data outputted from the frame buffer 200 by units of scan, detecting image data having hue values greater than a hue reference value among hue values of image data corresponding to the scanned vertical line, and determining a vertical line corresponding to the detected image data as a smear vertical line; and a smear vertical line correction unit 400 for correcting the determined smear vertical line with image data adjacent to the determined smear vertical line. Herein, the hue values of image data corresponding to the smear vertical line are greater than the hue reference value (e.g., a hue value of 233 or higher).

The smear vertical line determining unit 300 can detect a light source (e.g., the sun) from the captured image, and determine a vertical line appearing based on the center of the detected light source as a smear vertical line. For example, the smear vertical line determining unit 300 can scan a vertical line of image data outputted from the frame buffer 200, detect image data (a circular light source) partially having hue values greater than the hue reference value from the scanned vertical line (namely, 10%~30% image data having hue values greater than the hue reference value), recognize the detected image data as a light source, and determine the determined smear vertical line as a final smear vertical line when the determined smear vertical line is positioned based on the center of the recognized light source.

Herein, the image data (the circular light source) partially having hue values greater than the hue reference value can be present on a plurality of vertical lines, and the smear vertical line determining unit 300 recognizes the image data partially having the hue values greater than the hue reference value detected from the plurality of vertical lines as a light source. For example, when it is assumed that image data corresponding to a specific vertical line is 100%, if 10%~30% image data corresponding to the specific vertical line has hue values greater than the hue reference value, the 10%~30% image data can be recognized as a light source.

Accordingly, only the smear vertical line that appears centered about the light source of the image is corrected. For example, when the determine smear vertical line is positioned based on the center of the recognized light source, the smear vertical line correction unit 400 corrects the finally determined smear vertical line with image data adjacent to digitized image data corresponding to the finally determined smear vertical line.

Herein, the hue reference value can be a saturation value (e.g., an RGB (red-green-blue) hue value having a 255 value) or a value adjacent to the saturation value. For example, when the RGB (each pixel) hue value is 255-255-255, the RGB hue is white hue. When the RGB hue value is 0-0-0, the RGB hue is black hue, and when the RGB hue value is 0-0-255, the RGB hue is blue hue. Namely, the hue value has 0-255 values and the saturation value refers to a hue value having the 255 value. Thus, since the smear vertical line is white hue or a hue close to white hue, it is preferred that a value adjacent to the saturation value is determined as the hue reference value.

The operation of the image correcting apparatus in accordance with the present invention will now be described with reference to FIGS. 3 and 4.

Figure 4:
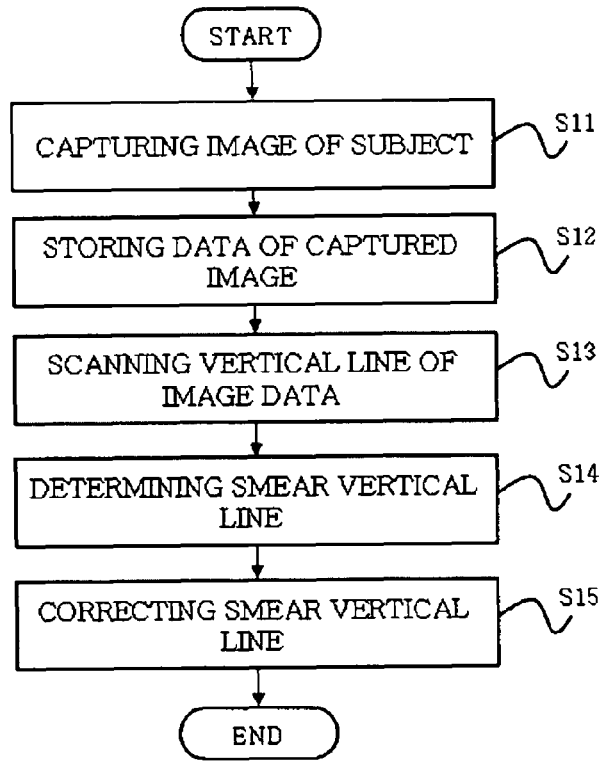
FIG. 4 is a flow chart illustrating the processes of an image correcting method in accordance with the present invention.

FIG. 4 is a flow chart illustrating the processes of an image correcting method in accordance with the present invention.

First, the CCD camera 100 captures an image of a subject according to a user request, and outputs image of the captured image of the subject to the frame buffer 200 (step S11).

The frame buffer 200 stores the image data and outputs it to the smear vertical line determining unit 300 (step S12). Herein, when the image data is stored in the frame buffer 200, information of each pixel of the image data has an address. Thus, image data corresponding to the vertical line can be analyzed based on the address.

The smear vertical line determining unit 300 scans a vertical line of the image data outputted from the frame buffer 200 by units of scan (step S13), detects image data having hue values greater than the hue reference value among hue values of the image data corresponding to the scanned vertical line, and determines the vertical line corresponding to the detected image data as a smear vertical line (step S14). At this time, the scan unit can be set in consideration of a calculation speed. For example, the more the vertical lines, the higher the calculation rate but the less the precision, so the scan unit can be set as an optimum experimentation value in consideration of the number of pixels of the CCD camera 100.

In addition, the smear vertical line determining unit 300 can detect image data (circular light source) partially having hue values greater than the hue reference value form the scanned vertical line and recognize the detected image data as a light source, and when the determined smear vertical line is positioned based on the center of the recognized light source, the determined smear vertical line determining unit 300 can determine the determined smear vertical line as a final smear vertical line.

Thereafter, the smear vertical line correction unit 400 corrects the determined smear vertical line. For example, the smear vertical line correction unit 400 replaces the image data corresponding to the smear vertical line with data adjacent to digitized image data corresponding to the determined smear vertical line (step S15).

Also, the smear vertical line correction unit 400 can correct the finally determined smear vertical line with image data adjacent to the digitized image data corresponding to the finally determined smear vertical line.

In this manner, in the image correcting apparatus and method in accordance with the present invention, the light source such as electric light or the sun is captured as an image, and when a hue value of the image data corresponding to a specific vertical line of the captured image is the saturation value or close to the saturation value, the image data corresponding to the specific vertical line is corrected with data adjacent to the image data corresponding to the specific vertical line to thereby remove the smear phenomenon.

In addition, the image correcting apparatus and method in accordance with the present invention can be applied for various cameras which generate the smear vertical line, as well as to the CCD camera.

As so far described, the image correcting apparatus and method in accordance with the present invention have many advantages.

That is, for example, by correcting image data corresponding to a vertical line of an image captured by the camera and having hue values greater than hue reference value, occurrence of the smear phenomenon can be prevented. Specifically, the vertical line of the image data is scanned, image data having hue values greater than the hue reference value is detected from hue values of image data corresponding to the scanned vertical line, the vertical line corresponding to the detected image data is determined as a smear vertical line, and the determined smear vertical line is corrected with image data adjacent to the determined smear vertical line, whereby the smear vertical line can be removed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for correcting an image, the apparatus comprising:
   a detecting unit configured to:
      scan a vertical line of an image by a scan unit, the image captured by a camera, the scan unit based on a number of pixels of the camera for a calculation speed;
      detect first image data corresponding to the vertical line of the image, the vertical line having hue values greater than a saturation value of RGB (Red-Green-Blue) hue;
      detect second image data having hue values greater than the saturation value from the scanned vertical line, wherein the second image data is an approximately circular image having the hue values greater than the saturation value;
      recognize the second image data as a light source if the second image data having the hue values greater than the saturation value is within 10% to 30% of a corresponding vertical line; and
      determine whether the vertical line extends in a substantially straight direction from an approximate center of the recognized light source towards an edge of the image; and
   a correction unit configured to correct the first image data in response to the determination that the vertical line extends in the substantially straight direction from the approximate center of the recognized light source towards the edge of the image, wherein said edge is approximately perpendicular to the vertical line,
   wherein the detecting unit is further configured to determine whether the vertical line is vertically positioned about the approximate center of the recognized light source, and
   wherein the correction unit is further configured to correct only the first image data corresponding to the vertical line with image data adjacent to the first image data in response to the determination that the vertical line is vertically positioned with respect to the approximate center of the recognized light source.

2. The apparatus of claim 1, wherein the camera is a CCD (Charged Coupled Device) camera.

3. The apparatus of claim 1, wherein the detecting unit determines the vertical line corresponding to the first image data as a smear vertical line.

4. The apparatus of claim 1, wherein the correction unit replaces the first image data with the image data adjacent to the first image data.

5. An apparatus for correcting an image, the apparatus comprising:
   a smear line determining unit configured to:
      scan a vertical line of an image by a scan unit, the image captured by a camera, the scan unit based on a number of pixels of the camera for a calculation speed;
      detect first image data of the image that have hue values greater than a saturation value of RGB (Red-Green-Blue) hue and correspond to the scanned vertical line;
      determine the scanned vertical line corresponding to the detected first image data as a smear line;
      detect second image data of the image that have hue values greater than the saturation value from the scanned vertical line, wherein the second image data is an approximately circular image having the hue values greater than the saturation value;
      recognize the second image data as a light source if the second image data having the hue values greater than the saturation value is within 10% to 30% of a corresponding vertical line; and
      determine whether the determined smear line extends in a substantially straight direction from an approximate center of the recognized light source towards an edge of the image; and
   a smear vertical line correcting unit configured to replace the determined smear line with image data adjacent to the determined smear line in response to the determination that the determined smear line extends in the substantially straight direction from the approximate center of the recognized light source towards the edge of the image,
   wherein said edge is approximately perpendicular to the smear line,
   wherein the smear line determining unit is further configured to determine whether the determined smear line is vertically positioned about the approximate center of the recognized light source, and
   wherein the smear vertical line correcting unit is further configured to replace only the determined smear line with the image data adjacent to the determined smear line in response to the determination that the determined smear line is vertically positioned about the approximate center of the recognized light source.

6. An apparatus for correcting an image, the apparatus comprising:
   a buffer configured to store image data corresponding to an image captured by a CCD (Charged Coupled Device) camera;
   a smear line determining unit configured to:
      scan the captured image for a vertical line in the image data output from the buffer by a scan unit based on a number of pixels of the CCD camera for a calculation speed;
      detect first image data of the image data that have hue values greater than a saturation value of RGB (Red-Green-Blue) hue and correspond to the scanned vertical line;
      determine the scanned vertical line corresponding to the detected first image data as a smear line;
      detect second image data of the image data that have hue values greater than the saturation value from the scanned vertical line, wherein the second image data is an approximately circular image having the hue values greater than the saturation value;
      recognize the second image data as a light source if the second image data having the hue values greater than the saturation value is within 10% to 30% of a corresponding vertical line; and
      determine whether the determined smear line extends in a substantially straight direction from an approximate center of the recognized light source towards an edge of the captured image; and a smear line correction unit configured to correct the determined smear line with image data adjacent to the determined smear line in response to the determination that the determined smear line extends in the substantially straight direction from the approximate center of the recognized light source towards the edge of the captured image, wherein said edge is approximately perpendicular to the smear line, wherein the smear line determining unit is further configured to determine whether the determined smear line is vertically positioned about the approximate center of the recognized light source, and wherein the smear line correction unit is further configured to correct only the determined smear line corresponding to the scanned vertical line with the image data adjacent to the determined smear line in response to the determination that the determined smear line is vertically positioned about the approximate center of the recognized light source.

7. A method for correcting an image, the method comprising:

scanning a vertical line of an image by a scan unit, the image captured by a camera, the scan unit based on a number of pixels of the camera for a calculation speed;

detecting first image data of the image that have hue values greater than a saturation value of RGB (Red-Green-Blue) hue and correspond to the scanned vertical line;

determining the scanned vertical line corresponding to the first image data as a smear line;

detecting second image data of the image that have hue values greater than the saturation value from the scanned vertical line, wherein the second image data is an approximately circular image having the hue values greater than the saturation value;

recognizing the second image data as a light source if the second image data having the hue values greater than the saturation value is within 10% to 30% of a corresponding vertical line; and correcting the first image data with image data adjacent to the first image data in response to determining that the smear line extends in a substantially straight direction from an approximate center of the recognized light source towards an edge of the captured image, wherein said edge is approximately perpendicular to the smear line, wherein correcting the first image data comprises correcting only the first image data corresponding to the scanned vertical line with the image data adjacent to the first image data in response to determining that the smear line is vertically positioned about the approximate center of the recognized light source.

* * * * *